(12) United States Patent
Adam et al.

(10) Patent No.: US 7,993,688 B2
(45) Date of Patent: Aug. 9, 2011

(54) METHOD OF PREPARING A LIQUID, CONTAINING PROTEINS FOR SUBSEQUENT SEPARATION, BY USING ONE OR MORE PROTEIN-COMPLEXING AGENTS

(75) Inventors: Pierre Adam, Tourinnes-Saint-Lambert (BE); Patrick Haselaars, Koersel (BE); Philippe Janssens, Wavre (BE)

(73) Assignee: Anheuser-Busch InBev S.A., Brussels (BE)

( * ) Notice: Subject to any disclaimer, the term of this patent is extended or adjusted under 35 U.S.C. 154(b) by 650 days.

(21) Appl. No.: 11/597,101

(22) PCT Filed: May 18, 2005

(86) PCT No.: PCT/IB2005/001354
§ 371 (c)(1),
(2), (4) Date: Jun. 30, 2008

(87) PCT Pub. No.: WO2005/113738
PCT Pub. Date: Dec. 1, 2005

(65) Prior Publication Data
US 2008/0275223 A1 Nov. 6, 2008

Related U.S. Application Data

(60) Provisional application No. 60/571,937, filed on May 18, 2004.

(51) Int. Cl.
*C07K 1/14* (2006.01)
(52) U.S. Cl. .............................. 426/7; 426/12; 426/423
(58) Field of Classification Search ................ 426/7, 12, 426/423
See application file for complete search history.

(56) References Cited

U.S. PATENT DOCUMENTS

| 4,344,846 A | 8/1982 | Klein |
| 5,628,910 A | 5/1997 | Michos |
| 6,117,459 A * | 9/2000 | Van Den Eynde et al. ....... 426/7 |

FOREIGN PATENT DOCUMENTS

| DE | 100 51 266 | 4/2002 |
| RU | 2174538 | 10/2001 |
| SU | 1451159 | 1/1989 |
| WO | WO 96/35497 | 11/1996 |

* cited by examiner

*Primary Examiner* — Anthony Weier
(74) *Attorney, Agent, or Firm* — Levy & Grandinetti (57) ABSTRACT

The invention relates to a method of preparing a liquid, which contains proteins (esp. haze sensitive proteins), for subsequent separation of at least haze-forming material, when predetermined filter aids are used. The method includes the addition of protein-complexing agent to the liquid, which agent is capable of forming a complex with at least some sensitive proteins of the liquid, to result in a limitation of the residual haze of the liquid, obtained after the separation (e.g. filtration), step.

16 Claims, 7 Drawing Sheets

Figure 9
Treatment of 0.7 g/hl of gallotannins (Brewtan®)

Figure 10
Treatment of 9.3 g/hl of silica sol ((LUDOX®)

METHOD OF PREPARING A LIQUID, CONTAINING PROTEINS FOR SUBSEQUENT SEPARATION, BY USING ONE OR MORE PROTEIN-COMPLEXING AGENTS

This application is the U.S. National Phase of PCT Application No. PCT/M2005/001354 filed May 18, 2005, which claims priority to U.S. application Ser. No 60/571,937, filed May 18, 2004.

FIELD OF THE INVENTION

The invention relates to a method of preparing a liquid, which contains proteins. The invention further relates to the addition of a protein-complexing agent to the liquid, so as to obtain a limited haze in the final liquid obtained after a separation step.

BACKGROUND OF THE INVENTION

The visual aspect of a liquid and particularly for beer represents a key element for most consumers. In that sense, the "brilliance" and the visual perception of beer's physical stability is an important quality aspect. The brewers carry out a series of distinct processing steps, each of which impacts on the final character and quality of the resulting beer product—including, for example, product clarity, and in particular beer "haze".

Haze is a visual manifestation of the physical instability of the beer, and can be subdivided into three main groups, biological, microbial and non-biological. Biological hazes are caused by the presence of carbohydrate (e.g. unmodified starch, dextrin), beta-glucan, pentosan, and/or oxalate resulting from inappropriate processing steps. Microbial hazes, which cannot be remedied, are caused by infection of the beer by yeast, bacteria, mould or algae, and result from poor hygiene of the beer. Non-biological hazes, which are also characterized as colloidal hazes, are by far the largest clarity risk in beer, and this patent specification will principally focus on them.

The precursors responsible for the non-biological instability are proteins and polyphenols, and more specifically tannins. The formation of their complexes is increasingly exacerbated by parameters such as concentration of precursors, heat, oxygen, heavy metals, aldehydes and movement. It is also possible to make the distinction between "chill haze" and "permanent haze".

"Chill haze" is formed when beer is chilled to 0° C. and re-dissolves when beer is warmed up to 20° C. or room temperature. It is a reversible complex formed by low molecular weight polyphenols and proteins, in which the hydrogen bonds are weak. The particle complexes are sub-micron sized (<1 μm), and can be considered as a precursor of the "permanent haze".

"Permanent haze" is present in beer even at 20° C. and does not re-dissolve with time. This non-reversible haze is characterised by strong links, such as covalent bonds, between polymerised polyphenols and proteins. The complex size is up to 5 μm.

Haze intensity is defined by an EBC method (Analytica-EBC, Method 9.29, 5$^{th}$ edition 1997), which involves the measurement of light scattering at an angle of 90° to the incidence beam, calibrated with formazin standard solution. On the EBC scale, which is linear, the haze intensity of the beer is classified as follows:

| | |
|---|---|
| Brilliant | <0.5 EBC |
| Almost brilliant: | 0.5-1.0 EBC |
| Very slightly hazy: | 1.0-2.0 EBC |
| Slightly hazy: | 2.0-4.0 EBC |
| Hazy: | 4.0-8.0 EBC |
| Very hazy | >8.0 EBC |

Certain studies show that the size of the particles contained in the haze could be characterized by using different scattering angles of measurement. It is generally recognized that 90° scattering angle is more sensitive to small particles, peaking around 0.5 μm, and is sensitive to particles so fine that the effect is difficultly perceived by human eye. The so called "90° haze" is also termed by some authors "invisible haze". On the other hand, the 25° scattering angle does not suffer from the same visual effect and is more sensitive to larger particles, which are bigger than 0.5 μm. The so called "25° haze" is also termed by some authors "visible haze".

There exists other unit scales with good correlation with the EBC scale:
  NTU (Nephelomotric Turbidity Unit), where 4 NTU are equivalent to 1 EBC
  ASBC (American Society of Brewing Chemists), where 69 ASBC are equivalent to 1 EBC.

The major components of haze in beer are principally proteins and polyphenols but also small amounts of metal ions, oxalic acid, and polysaccharides.

Proteinaceous substances provide the greater part of non-biological hazes. Acidic proteins (esp. those having isoelectric point about pH 5.0) are important in the formation of chill haze and appear to be formed during mashing. Studies have shown that proline in haze-forming proteins is important for the interaction with polyphenols. These particular proteins derive mainly from malt hordein and are largely responsible for chill haze. As little as 2 mg/l of protein is enough to induce a beer haze of 1 EBC unit.

Tannins are important molecules in brewing and derive from, inter alias, both hops (20-30%) and malt (70-80%). They have the capacity to precipitate with proteins, which are denatured during wort boiling, to form the hot break and also in cold wort to form the cold break. During post fermentation process (e.g. cold storage), when the temperature is around 0° C., they are involved in the formation of chill haze and permanent hazes.

Polyphenols embrace a wide range of plant substances possessing in common an aromatic ring with one or more hydroxyl groups. Polyphenols may conveniently be divided into several classes, based on the chemical structure of the molecule:
  flavonols, monomeric species with structures of the type displayed by quercetin, but usually present in hops as glucosides,
  flavanols, monomeric species with structures of the type displayed by cathechin,
  flavanoids, oligomers of flavanols (e.g. procyanidin B3, prodelphinidin B3),
  proanthocyanidins, also called anthocyanogens, molecules cleavable by acid to form substance which polymerize in the presence of oxygen to pigments called anthocyanidins,
  tannoids, polymers of flavanoids which are intermediates in the formation to tannins and,
  tannins, polymers of flavanoids of a size sufficient to precipitate proteins.

Various studies have shown that monomeric polyphenols have little effect on haze formation but that dimers and trimers strongly accentuate haze formation. Polymerization of polyphenols is promoted by oxygen. The oxidation reaction can be catalysed by enzymes such as polyphenol oxidase and peroxidase.

Polyphenols on their own, contribute little to haze formation. Haze is instead composed fundamentally of complexes between condensed polyphenols (tannins) and proteins.

Figure 1:
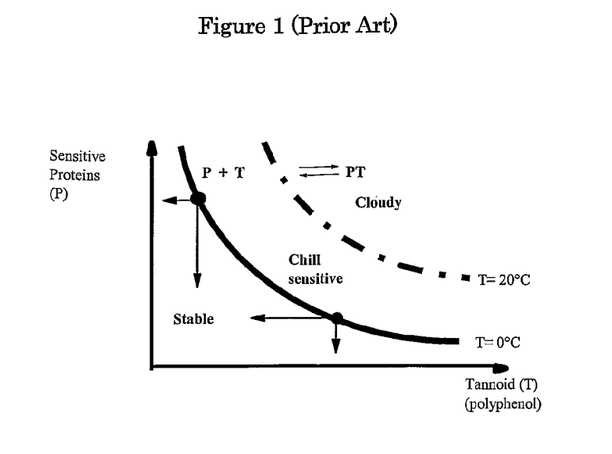
FIG. 1 is a graphical representation of the Equilibrium of protein and polyphenol, according to Chapon's prior art model. The haze formation is expressed in function of the respective concentrations of the tannoid and the sensitive proteins present in beer.

The mechanism of the interaction between sensitive proteins and polyphenols to create haze has been described by Chapon et al and is illustrate at FIG. 1.

Chapon's model states that in a complex matrix such as beer, proteins (P) and tannoids (T) are in chemical equilibrium in all steps of malt and beer production, with the protein/tannoid (P–T) product occurring in dissolved or insoluble form. The formation and the stability of P–T complexes are summarized as follows:

$P+T \leftrightarrow P\text{-}T \rightarrow P\text{-}T$ (soluble) (soluble) (insoluble)

The soluble P–T is more likely in form of insoluble nano-colloids, much too small to lead to invisible haze. They serve however as nuclei for particle growth and subsequent haze development.

These chemical equilibria depend on the nature and structure of the tannoids and proteins. Moreover the probability for one sensitive protein to meet one tannoid depends on their relative concentration, the agitation and the temperature.

They can be shifted to the left, by removing either protein or tannoid, with less probable P-T precipitates.

As opposed to this, addition of high-molecular protein or tannin will shift equilibrium to the right, P–T compounds become insoluble and are precipitated. Cooling of beer has the same effect with P–T compounds becoming insoluble, due to increased interaction between P and T.

A third dimension can be added, which is time, during which, simple polyphenols (i.e. flavanols) polymerize to tannoids and then tannins. The polymerization rate is directly correlated to the initial concentration of polyphenols and the presence of oxygen.

There are a large numbers of factors that effect beer quality, and in particular its initial and long term haze.

Barley varieties vary considerably in their content of polyphenols. It is also recognized that maritime barley varieties are higher in polyphenols than continental varieties. The majority of the polyphenols are concentrated in the husk, and therefore winter barley has relatively higher levels compared to spring varieties. It is generally recognized that 6-row barleys have a higher level of polyphenols than 2-row barley varieties. Some low-anthocyanogen barley varieties have been developed and are used to improve the colloidal stability of beer. From the protein perspective, it is less clear that a given barley variety is particularly low or high in its level of haze-active protein, also called sensitive protein. It is reasonable to expect that a positive correlation exists between the potential haze formation and the level of nitrogen in the barley. The malting process can provide higher colloidal stability when the malt is well modified. The polyphenol level in raw materials impacts more on the future colloidal stability than protein level.

Replacement of barley with other sources of starch or carbohydrates (e.g. rice, maize, syrup) will dilute all types of haze precursors. Wheat based adjuncts on the other hand will increase risks in haze formation, due to the increased content of haze sensitive protein, polyphenol composition, presence of glucans and pentosans, if contains.

Hops also provide polyphenols, which are generally more polymerized as compared to the polyphenols which are present in malt. Aroma varieties tend to bring higher levels of polyphenols for an equivalent bitterness contribution.

Malt grinding is the first operation, which can affect the colloidal stability, when oxygen is present together with polyphenols, resulting in a polymerisation and therefore increasing chill-haze precursors (e.g. potential precipitation of polyphenols with proteins).

Mashing involves mixing ground malt and other ground cereals with water in order to enzymatically degrade proteins into amino-acids and peptides and starch into fermentable sugars (e.g. glucose, maltose and maltotriose) and dextrins. The quality of the water plays an important role, and the brewer will preferably use water with a low residual alkalinity; low pH of the mash will promote enzymatic degradation of high molecular weight substances. High pH of water would increase the polyphenol extraction, with negative consequences on colloidal stability of beer. It is also important that there is sufficient calcium in the mash to ensure precipitation of oxalate. Methods of mashing affect the colloidal stability. For example decoction is better than infusion, because more protein denaturation, more polyphenol extraction and more oxidation, lead to better removal of haze precursor, via precipitation in the hot break and the cold break.

Filtration of the mash is a step which separates liquid and solid phases, where the liquid phase is called un-hopped wort. The pH of the sparging water is, as mentioned before, important for the colloidal stability. Moreover a high temperature and a high volume of water will extract more polyphenols. The polyphenol level, impacts negatively on the colloidal stability, if the polyphenols are not removed before bottling, and on the other hand impacts positively, if the they are removed (i.e. by precipitation), before bottling operation.

Wort boiling, in general, is to sterilize the wort, to remove the undesirable volatile compounds and to extract and isomerize the bitterness substance from hops, and to removed, by denaturation, excess of protein. This process step occurs during 60 and 90 minutes, and is essential for colloidal stability in order to obtain a well-formed hot break, which is the precipitable material that would otherwise survive the process to destabilize beer. The hot break is removed by decantation, centrifugation or by whirlpool. The intensity of the boil (evaporation of minimum 5-6% is required), the pH of wort (preferably between 5.1 and 5.3), agitation (as low as possible) and oxidation (negative for flavour stability, but positive for haze life due to the oxidation of polyphenols), are the most important parameters which influence the formation of hot break.

Prior to the fermentation process the wort is cooled to fermentation temperature, oxygenated (either with air or pure oxygen) and pitched with yeast. Fermentation is the conversion by yeast of fermentable carbohydrates into ethanol, carbon dioxide and other compounds, which give the specific character of the beer. Depending on the yeast strain, the fermentation temperature ranges between 10° C. and 15° C. for lager yeast strains and between 20° C. and 30° C. for top fermentation yeast strains. During the fermentation stage, there is an adsorption of polyphenols onto the yeast cell surface. In the cold wort proteins, polyphenols and carbohydrates trend to interact with each other and to form sub-micron non-soluble particles, called "cold-break". The resulting colloids can serve as nuclei for the further growth of chill-haze particle during cold maturation. The formation and the removal of the cold-break, and the association of tannins with proteins, both represent the major changes, impacting positively on the colloidal stability.

After the fermentation stage, beer is typically chilled to as low a temperature as possible without freezing (e.g. −2° C.). The cold-conditioning stage is particularly critical to develop "chill haze". Each increase of the temperature will re-dissolve haze, and therefore will return haze precursors to beer, with the danger of developing the haze afterwards. At this stage, judicious use of finings can help the sedimentation of the formed haze.

Clarification is required following fermentation, because the beer is quite turbid due to the presence of yeast, protein/polyphenol complexes, and other insoluble material, all of which are responsible for haze formation in beer. Extended lagering periods at low temperatures, the addition of finings to the beer, and centrifugation are some of the techniques that brewers use to remove these substances.

The precipitable chill haze should be removed from beer, either during beer filtration or before. This operation can be realized by a simple elimination in whole or in part of at least part of the precipitated material, what brewers call "purge", by transfer from tank to tank, and/or by centrifugation of beer.

Temperature control is critical, because their influence can re-dissolve quickly the haze precursors, with no possibility of re-precipitating the complex before the filtration step, with the consequence that the precursors will pass through the filter into the bright beer.

The significance of a filtration operation in industrial processing derives not only from its direct impact on the filtered material, but also because it can be one of the last opportunities that a producer has to directly impact one or more of the quality determinants of the product. In the case of brewing, for example, filtration is typically the final pre-packaging step in the brewing process, and therefore perhaps the last chance that a brewer has to directly effect (in both the pro-active and the remedial sense) a beer's initial quality and, from a constituents perspective, its shelf-life.

As outlined by Gottkehaskamp, L., Oechsle, D., *Precoat Filtration with Horizontal Filters*, Brauwelt Int. 16, 128-131, 1998, the role of filtration in brewing includes improvements related to initial beer clarity, (as well as dealing in greater or lesser degree with incipient haze forming precursors), and factors that can adversely effect post-packaging flavour changes, primarily through: the removal of haze substances such as protein/polyphenol complexes, hop extracts and the like; aiding biological stability through the removal of at least a portion of the post-fermentation burden of micro-organisms; and removal of other dissolved macromolecules such as residual starches and dextrins as well as $\alpha$- and $\beta$-glucans.

According to Donhauser, S., Wagner, D., *Crossflow-Mikrofiltration von Hefe und Bier*, Brauwelt 132, 1286-1300, 1992, kieselguhr alluviation has served for well over half a century as the dominant filter aid in beer filtration. Kieselguhr was first adopted in beer filtration in the United Kingdom in the late 1930's—but it was only later that it was actually adopted in the form in which it is currently most commonly used in the USA—and then subsequently introduced into the European brewing community.

While kieselguhr filtration (also known in the art as diatomaceous earths or "DE" filtration), is and may remain a major if not dominant type of filter aid mediated filtration (alluviation) for brewing and other industries (e.g. DE filtration is also employed in the wine making), there are a number of emergent, alternative filtration technologies. Technologies such as cross-flow micro filtration and a variety of membrane techniques have been introduced—although none have as yet gained widespread acceptance. (See for example, Meier, J., *Modern Filtration—Overview of Technology and Processes*, Brauwelt Int. 11, 443-447, 1993).

Filtration is generally understood in terms of a mechanical separation of various liquid/solid components from a suspended mixture thereof. These "suspensions", (as used herein in the broad sense of the word, suspensions does not imply any particular particle size ranges, but only that the particulates are carried or suspended in the fluid flow), are passed through a porous filtration aid and at least some of the particulates are retained on or within the filtration medium while the then at least partially clarified liquid, (i.e. the "filtrate"), exits the filtration unit. Eβlinger, (Eβlinger, H. M., *Die Bierfiltration*, Brauwelt 132, 427-428, 1992), points out that there are a variety of distinctly different modes of the solid separation that employ filtration media:

surface or cake filtration, (sometimes also referred to as alluviation): wherein the solids in suspension together with an added amount of filter aid, (such as DE), are hold back by a filter cake supporting surface, on which the filter cake is built. Here, the solid separation takes only place at the surface of the cake;

deep or sheet filtration: The filter medium mostly consists of a thick layer with pores inside, which hold back the solid particles; and, sieve filtration: Particles which are bigger than the filter pore size are kept on the surface of the medium.

The application of the present invention and the particulars of its disclosure herein are primarily focused on the first of the above listed modes of filtration. In DE powder filtration (alluviation) the DE filter aid is injected into the beer stream at a location slightly upstream of the point where it is collected on a supporting mesh. Beer filtration is started when the precoats are established and the recirculating liquid is clear. The beer stream bearing the DE, together with the yeast and other suspended solids, then forms a largely "incompressible" mass referred to as the "filter-cake." To prevent clogging of small pores of the filter and to achieve extended filter runs; the filter aid is continually metered into the unfiltered beer as "body feed."

The porous bed supports a surface that traps suspended solids, removing them from the beer and the supporting bed is only "incompressible" in the sense that the beer can continue to pass through these pores as the filter cake continues to form and the operating pressures continue to rise over the course of the filter's operational cycle. For the purposes of mathematically modeling its flow-through characteristics, the cake is treated as being compressible—see the discussion below on porosity). The ongoing supply of filter aid, (referred to as "body-feed"), is continually added into the flow of beer to maintain the permeability of the cake. Not all of the particles will be trapped at the surface; some, and especially finer materials, will pass into the filter cake and be trapped—a process referred to as "depth filtration." Depth filtration is not as effective as surface filtration, but is still a significant mechanism of filtration by filter aids. That inefficiency notwithstanding, it is prudent in all cases to start the body feed phase of the filtration cycle with a high dosing rate and decrease it as the differential pressure decreases across the filter bed. Under dosing of body feed will cause premature fouling of the surface of the filter cake, leading to an undesirably abbreviated filter cycle.

For alluviation filtration processes in general, (and including in particular those in which kieselguhr is employed as the filter aid), the common industrial filters can be classified by the following typology: 1) frame filters; 2) horizontal filters; and 3) candle filters.

Note in this connection that frame filters are what is referred to as "open", and are not fully automated systems. Horizontal and candle filters, by comparison are "closed" and fully automated, (Kolcyk, M., Oechsle, D., *Kesselfiltrationssysteme für die Anschwemmfiltration*, Brauwelt 139, 294-298, 1999; and, Kolcyk, M., *Vessel Filter Systems for Precoat Filtration*, Brauwelt Int. 17, 225-229, 1999). The fact that frame filters are typically labor intensive with respect to cleaning, has lead to systems that are based on the other two filtration types gaining predominance in industrial applications. (See: Leeder, G., *Comparing Kieselguhr Filter Technologies*, Brew. Dist. Int. 21, 21-23, 1990).

In order to induce the suspension to flow efficiently through the filtration medium, (i.e. in order to compensate for the pressure drop in the fluid flow across the filtration medium, a pressure differential (usually by way of an upstream pump) in the operation of most filtration systems.

In the case of a hypothetical of "idealized" cake filtration with laminar flow through an incompressible porous filter cake by incompressible Newtonian fluids, Darcy's law is valid:

$$dV/(A\,dt) = (u\,dP)/(\eta_L R) \quad \{1\}$$

Under these conditions, it follows that the specific flow u is proportional to the applied pressure difference dp and inversely proportional to the dynamic viscosity of the filtered liquid $\eta_L$. In other words, the higher the applied pressure difference and the lower the viscosity, the higher filtrate flow per surface unit (specific flow). In addition, the flow is also influenced by the filtration resistance R, which in turn depends on the flow resistance of both the cake and the filtration aid.

Eβlinger goes on to point out that in the more practical reality of a compressible filter cake, the specific gravity and therefore, the resistance of the filter cake is tremendously increased.

In addition, to the porosity of the filter cake, per se, the statistical distribution of the pore sizes plays an important role in filtration.

The Hagen-Poisseuille law describes the laminar flow through parallel cylindrical capillaries:

$$dV/(dt\,A) = u = (dp\,\epsilon d_0^2)/(\eta_L 32\,h_k) \quad \{2\}$$

with porosity $\epsilon$, capillary diameter $d_0$ and filter height $h_k$. In reality however, the porosity function is validly described by the equation of Carman-Kozeny, which according to Eβlinger's detailed discussion, demonstrates that the influence of any given change in porosity, on the flow rate, is actually quite high. For example, if the porosity is decreased from 40 to 30%, the specific flow is reduced by 70%. The general differential equation for cake filtration is:

$$dV/(dt\,A) = dP/(\eta_L(\alpha h_k + r_0)) \quad \{3\}$$

with the specific cake resistance $\alpha$ and the resistance of the filter medium $r_0$. In practical operations, almost all filter cakes are more or less compressible, especially those which originate from fine-grained and easily deformable solids.

For practical operations Darcy's law can also be written as (8):

$$dp = u\,\eta_L h_k/\beta \quad \{4\}$$

with the cake permeability $\beta$

It follows from equation {4}, that an alluviation filter will behaves as follows: when the specific flow rate doubles, the pressure difference doubles accordingly. However, since dosage of body-feed must also be doubled in order to maintain the cake's permeability to enable flow, the cake depth doubles. Consequently, for a doubling of the specific flow rate, the pressure difference quadruples. However, to maintain the same pressure drop gradient through a filter run, when the specific flow rate is increased, the kieselguhr dose rate must be increased by the square of the new specific flow rate rationed to the original. Clearly, filter run time is inversely proportional to the quantity of kieselguhr dosed, (see for example, Leeder, G., *The Performance of Kieselguhr Filtration—Can It be Improved?*, Brew. Dist. Int. 23, 24-25, 1992.)

Alluviation filtration is further complicated by the available equipment options (see Leeder, G., Comparing Kieselguhr Filter Technologies, Brew. Dist. Int. 21, 21-23, 1990).

A horizontal filter (HF) consists of a one-piece vessel with two fixed horizontal metal plates. The element package consists of plate-like filter elements which are fixed to the central hollow shaft and are able to rotate due to a drive assembly. A leaf usually consists of a carrier plate supporting a strong coarse mash which, in turn, supports a fine mesh of openings of, for example only), about 70 μm. These items are bolted between peripheral clamps.

Unfiltered beer can enter the horizontal filter in two different ways depending on whether the particular horizontal filter is of the older S type or the more recent Z type.

The older construction allows the inlet to enter from the top metal plate and a distribution system (S-type). The beer-kieselguhr mixture is distributed from there between the vessel wall and the filter elements along the whole height of the filter. The filtrate is collected inside each filter plate and discharged via the hollow shaft. The S-type horizontal filter is characterized, (for example only), by a kieselguhr capacity of c. 7 kg/m$^2$ and a max. operation pressure of 7 bar.

The more recent Z-type horizontal filter was developed in order to achieve a more even distribution of the unfiltered beer, by providing an individual filter feed supply to each filter element with an inlet distributor manifold. As a consequence of this inlet arrangement, the distances over which the beer flows are significantly reduced. Even in the case of Z-type horizontal filter filters equipped with large leaf diameters, the maximum flow distance is below 75 cm. This construction enables an even distribution of the filter aid on the leaf and therefore, promotes a relatively more homogenous filter cake of more uniform height. Gottkehaskamp et al, (supra), found in trials a mean cake height of 12 mm with a standard deviation of 0.8 mm for more than 700 points of reference.

The short flow distances in Z-type horizontal filter filters mitigate against redistribution of the filter aid in the unfiltered beer on the upstream side of the filter support or leaf. Since the resulting filter cake is therefore very (relatively speaking) uniform throughout the filter, the quality of the filtrates are much better and the pre-coat quantity can be reduced to a minimum. Furthermore, the space between any two adjacent filter elements can then be much more fully utilized, which in turn allows for larger volumes of beer to be produced in any given operational cycle. Such "longer operational cycles" lead in turn to a more economic filtration operation.

It is implicit from the overall design of a Z-type horizontal filter, that damage of the filter elements by a kieselguhr overload of the filter is unlikely. For example, a filter load up to 11 kg/m$^2$ has been reported as being possible—and to cope with such high loading potential the Z-type horizontal filter is also designed for operating pressures of, for example, 9 bar. The benefit of operating at such pressures includes the fact that there is no reported negative impact on the quality of filtrate, (again, see Gottkehaskamp et al,—supra).

A typical candle filter consists of a cylindroconical vessel, which is separated in filtrate and retentate area by a plate. Another plate above this separation plate is used for filtrate collection. The cylindrical part of the vessel encloses the retentate area, while the conical part ensures a proper distribution of the raw kieselguhr and collects and discharges the waste kieselguhr at the end of filtration procedure. The non-filtered beer enters the vessel from the bottom tip of the conical part. The cylindrical candles are mounted vertically to the middle plate. They occupy around 55-75% of the vessel volume. A modern candle comprises a trapezoidal spiral wire welded, eight times per revolution, to rectangular support bars. The candle opening is asymmetric in that, externally it is 70 μm while internally, it is somewhat larger, thus avoiding the risk of plugging.

The surface per filter element is around $0.1$-$0.2$ $m^2$. In order to achieve a big filtration surface, many hundreds of candles have to be installed (e.g. 500 candles for a surface of 100 $m^2$). candle filter can accept trub in an amount of c. 7 kg kieselguhr/$m^2$. The candle filter construction is often designed for an operation pressure of max. 7 bar. Since there are no moving parts in a candle filter, it is called a static filter system.

Both, horizontal filter and candle filter are vessel filter systems, which show similarities. However, there are some decisive differences which are described as follows:

With respect to stability of filter cake, the horizontal filter provides a horizontal filter cake which is stable due to gravitation. Therefore, ongoing filtration is not affected by the stoppage of the plant, because the filter cake can not fall off the plate. In candle filter filtration however, the vertical filter cake has to be stabilized by a pressure difference caused by pumping. A shut down of the pump would result in slipping-off of the cake.

In connection with the pre-coating operation, a candle filter should be prepared by pre-coating immediately prior to the initiation of a filtration cycle. Otherwise the filter must be kept in the cycle modus which costs energy. Dealing with horizontal filtration, the filter preparation can be done already the day before filtration since the pre-coat is stable even without cycling and the filtration can be started at any time when the pre-coating is finished.

It is generally recognized for beer that the presence of yeast is limited to one yeast per liter, and the haze, is limited to 0.5 EBC with a maximum of 0.8 EBC (see paragraph on haze measurement), depending on beer specifications. DE can and is useful in delivering to these kinds of end product specifications. However, there are three fundamental problems inherent in the use of DE. First of all, DE affects the quality of the beer as it is a porous particulate, which leads to beer oxygen pick-up.

It also naturally contains slight amounts of metal ions which are catalysts for oxidation reactions. In addition, this material presents some health risks during its manipulation (e.g. inhalation). More recently these disadvantages have been compounded by the growing problem of disposal of the spent filter aids—and the associated costs thereof of waste disposal.

In the Practical Brewer, 1993, Master Brewers Association of America, point out that reactions leading to the formation of insolubles can continue even after filtration—and to deal with that problem, a variety of stabilization treatments can be employed. The effectiveness of DE filtration notwithstanding, there is often, although not always and in any case to varying degrees, an additional need to further enhance the colloidal stability of the beer. Essentially there are several candidate strategies for increasing the colloidal stability of beers: remove polyphenols, remove proteins, or remove a portion of each. Low temperature and low oxygen level are a pre-requisite for good general brewing practices in colloidal stabilization (and oxygen pick-up from DE can be a contributing problem in this connection too).

The removal of polyphenols is possible by adsorption on polyvinylpolypyrrolidone (PVPP), (or by precipitation with formaldehyde, which is for food-safety issues not generally a permitted practice). Due to its chemical structure, PVPP reacts preferably with polymerised polyphenols, flavanoids and tannins through hydrogen bonds and electrostatic weak forces. The affinity of polyphenols towards PVPP is higher than towards haze-active proteins in beer, due to the fact that PVPP has more active sites than proteins. Moreover, the interaction between polyphenols and PVPP is stronger and faster than between polyphenols and proteins. PVPP exists in two forms, the single use, which is finer (i.e. is a population made up of on balance, smaller particles) than the regenerable form. Single use PVPP presents a high surface/weight ratio, is dosed prior to the filtration, at a typical dosage rate between 10 and 30 g/hl, and is removed during the filtration step to make-up part of the filter cake. Regenerable PVPP is typically dosed continuously into the bright beer stream, between 25 and maximum 50 g/hl, and is collected on a specific filter (i.e. separate and apart from DE filtration), where it can be regenerated by contact with a solution of sodium hydroxide. This is the most economical way of producing a stable beer according to a shelf-life up to 6 months.

The removal of proteins is possible by adsorption on silica gels, silica sol or bentonite, by precipitation with gallotannins, or by enzymatic hydrolysis. Silica gel adsorbs proteins into its surface and the performance is a function of pore dimension, particle size, surface area and permeability. Silica gel removes preferably haze-forming protein, because it recognizes and interacts with the same sites on haze-active proteins as do polyphenols. Silica gels exist in three solid forms, the hydrogel, based on ≈70% moisture, the xerogel based on ≈5% moisture and the modified hydrogel, based on ≈30-35% moisture. The silica gel dosage can be applied during the cold maturation at a rate up to 50 g/hl, or in-line before the filtration step at a rate between 20 and 100 g/hl. A higher dosage rate could adversely affect the foam stability. Silica exists also on a liquid form, which is a colloidal silica hereafter called silica sol, to make the difference with silica gel, which is a powder. Due to its large surface area, the silica sol presents a high efficiency as adsorbing agent for haze-active proteins. Silica sol acts as silica gel acts, and the particles have the ability to cross-link and to form hydrogels with haze-active proteins, upon which they flocculate, finally forming sediment. Silica sol can be incorporated into wort or into beer. The addition to the hot wort is done at a rate between 40 and 70 g/hl of wort. When silica sol is added to the beer, the sol is injected directly into the beer stream during the transfer from fermentation to maturation at a rate of about 40 g/hl of beer, or the sol is injected directly into the beer stream during the transfer from maturation to filtration at a rate of about 15 g/hl of beer. Bentonite earth has long been used in the brewing industry, but is now rarely used, due to its non-specific binding with proteins, removing both haze and foam proteins. Gallotannins are naturally present in plants and can be extracted from gall nuts or Sumac leaves. It consists of polymerized tannic acid, which possesses many active sites (e.g. hydroxyl group) that react with protein in a similar way as tannoids, which explain the relative specificity for haze-active proteins. The insoluble complexes, which are formed can easily precipitate and can be removed from the beer. Tannic acid is not detrimental to foam stability when it is used at recommended dosage rates. Tannic acids exist in different commercial forms based on the product purity, and therefore may be used at different process steps: during wort boiling (2-6 g/hl), in cold beer maturation (5-7 g/hl), or just before the beer filtration (2-4 g/hl). The reaction time is relatively rapid and tannic acid may be dosed on-line, just prior to the beer filter. Due to the formation of a precipitate, the permeability of the filter cake will decrease, and it is recommended to use coarser grade of DE or a mix with perlite, in order to maintain the same filterability. Proteolytic enzymes hydrolyse hydrophobic proteins with no specificity for haze-active proteins, and consequently impact negatively on foam stability.

Various antioxidants (ascorbic acid and/or sulphites) have been used to either remove oxygen from beer or to negate its effect. These products may be added on-line during the filtration process, with a positive impact on colloidal stability.

Given the aforementioned and growing problems associated with the use of DE, a number of attempts have been made to utilize alternative alluviation filter aids—and in particular, to produce synthetic materials that might serve instead of DE. Some of these are also regenerable. Particularly promising advances are described in detail in EP 91870168.1; WO 1996/35497; and, WO96/17923. However, in spite of the quality of these advances, they are limited in their ability to match DE performance, and hence have not been widely adopted. Notable in this connection is the difficulty in reproducibly matching synthetic filter aid cake porosity to that of DE—although there are other underlying considerations which also bear on the relative performance issue.

Accordingly, there remains a need in the art for improvements in and to synthetic alluviation filter aids and/or their application, that can be then adopted as effective alternatives to DE.

SUMMARY OF THE INVENTION

The present invention therefore relates generally to improvements relating to alluviation filtration, and more particularly to improvements in the conditioning of filter aids (include the conditioned aids and methods for conditioning them), and by extension, to improved filter cakes and methods of filtration using same. In another aspect of the present invention, there is provided improvements in alluviation filtration through the use of complexing agents.

Therefore, and by way of example, the present invention relates in part to methods for preparing and/or filtering a liquid, which contains haze sensitive proteins (as complementary or in other words compatible reactants) for subsequent separation of at least haze-forming proteinaceous material. This method comprises the step of adding one or more protein-complexing agents capable of forming complexes that can be selectively retained during filtration, with at least some of the haze sensitive proteins. In brewing applications, the desired result, is to obtain a 25° haze of less than about 0.7 EBC, when using synthetic polymers or derivatives of silica or mixture thereof as filter aids, during the said separation step.

In accordance with another aspect of the present invention, there is provided methods of preparing and/or filtering a liquid, which contains haze sensitive proteins for subsequent separation of at least haze-forming proteinaceous material, said method comprising the step of adding one or more protein-complexing (e.g. flocculant) agents capable of forming complexes (e.g. flocs) with at least some of the haze sensitive proteins as compatible or complementary reactants, so as to obtain a 25° haze less than 0.7 EBC, when using, during the said separation step, a mixture of synthetic polymers as filter aids, wherein said mixture contains at least one polymer with an electronic charge.

Yet another aspect of the invention provides for conditioning of a filter cake used or for use in a separation step by adding one or more protein-complexing (flocculant) agents capable of forming flocs with at least some of the haze sensitive proteins contained in a liquid, resulting in a reduction of the porosity of said filter cake, which is constituted of a mixture of synthetic polymers as filter aids, wherein at least one such polymer and said flocs have mutually attractive electronic charges. Again, in a brewing application, it is desirable that the final filtration using this conditioned filter cake will result in a 25° haze less than about 0.7 EBC.

The invention relates too to conditioned filter aids, a filter cake comprising same and methods from producing same comprising reacting a complexing agent (i.e. a flocculating agent) and a compatible reactant (in that together they form a complex that can in general, be retained during filtration). Preferably, the reactant and the complexing agent are introduced in a fluid flow (e.g. a liquid flow as for example in an unfiltered beer stream), and it is especially preferred that the complexing agent be selected to react with a reactant that is indigenous to the unfiltered liquid and especially a reactant which filtration is itself intended to help remove. This complex then interacts with a synthetic alluviation filter aid to form a bound association there between. The agent, reactant and/or bound association thereof with the filter aid retained as a filter cake on a filter screen adapted for that purpose. The complexes are substantially retained in bound relation under the prevailing filtration conditions (including flow), within interstitial spaces or pores defined between filter aid materials in said cake, to thereby statistically condition the cakes porosity by reducing the variation and mean pore size distribution. This permits the cake to be conditioned so as to more closely approximate for example, the effective porosity of a comparable DE filter cake.

In light of the teachings of the present invention persons skilled in the art will find the selection and application of various complexing agents and reactants and filter aid materials useful in achieving the objectives of the present invention.

INTRODUCTION TO THE DRAWINGS

Appended hereto are FIGS. 1 through 13 of the drawings, in which.

DETAILED DESCRIPTION

The present invention relates to a method of preparing a liquid, for example beer, using a combination of a synthetic filter aid and one or more protein-complexing agents, in order to obtain retention of colloidal particles. These particles are present in the liquid, and are generally difficult to remove during the final filtration step. Using synthetic reusable polymer as a filter aid, the invention relates to of a specific effect of the protein-complexing agent in order to create a colloidal complex, which is retained during the filtration step, resulting in a significant decrease of the residual haze, measured at 90° and 25° scattering angle, of the filtered liquid. The preferred quantity of protein-complexing agent should be adjusted in order to limit the rate in which the differential pressure increases over the course of filtration, and is under the dosage which is necessary to obtain a significant positive effect on colloidal stability, which is necessary to provide the expected shelf-life of the filtered product. The present invention, preferably relates to the use of gallotannin prior to the filtration step of liquid such as beer, where the filter aid is a polymer.

Synthetic Polymers

This invention relates to the utilization of synthetic filter aid, derivatives of silica, including rhyolites of glass, and mixture thereof. Synthetic polymers are based variously on any one or more of polyamide, polyvinylchloride, fluorinated products, polypropylene, polystyrene, polyethylene, polybutene, polymethylpentene, ethylene copolymers, binary copolymers and terpolymers with acrylics, olefinic thermoplastic elastomers, and mixtures, polypolymers, or co-extrusions thereof.

The filter aids can be mixed with PVPP, and therefore can be used, for the precoat, as well as for the body feed deposition on the filter support, during the filtration process, resulting in an improvement of the colloidal stability, due to the specific interaction between polyphenols and PVPP. The filter aid or the mix of different filter aids, including PVPP could be reusable after a regeneration process, which is already patented (see WO96/35497).

There are at least four technical characteristics that bear on the suitability of a given sample of particulates, for use as an artificial aid from a "physical" point of view:

a.) The first three relate to particle shape, and are the most important of the four:

Uniformity defined by sphericity co-efficient (SC)—is the ratio of the average diameter of the actual particle and you equate to a perfect sphere 4 µl area divided by the actual length of the perimeter of the actual particle—and it is a comparison between the actual particle and a area/perimeter of a true circle. Done with an image analyzer (at least 20 particles) and the computer analyses a microscopic picture to derive this comparison).

Form Factor—is ratio of the smallest to the largest diameters of the particles—large form factors can lead to high delta p.

Isotropicity—defined in the patent—means that all the particles are more or less homogeneous in shape—i.e. they are all roughly the same shape—rather than for example a mixture of fibers and spheres; and, The sphericity co-efficient (SC) is the ratio of the average diameter of the actual particle to a perfect sphere. Its measurement can be done with an image analyzer (at least 20 particles) and the computer analyses a microscopic picture to derive this comparison). For example, the SC is 0.47 for the polyamide 11 Rilsan material mentioned elsewhere herein. The Capron polyamide 6 when ground or crushed for the purposes of the present invention can have an SC of about 0.57, for example.

The form factor is the ratio of the smallest to the largest diameters of the particles. This is defined more completely in published patent documents already referenced herein. For the Rilsan polyamide the form factor is about 0.44; and about 0.49 for the Capron polyamide. Note that large form factors (i.e. those associated with elongated fibrous particles), can compact to the point where the pressure drop across the filter bed becomes undesirably large and leads inevitably to reduced filtration life cycles.

Isotropicity is also defined in earlier cited patent documents, but in general means that all the particles are substantially homogeneous in shape—i.e. they do not include, for example, a mixture of fibers and spheres.

Overall, isotropic samples of particulates having form factors generally in the range of from 0.4 to 0.8 (preferably near 0.5) and SC.s of 0.4 to 0.65 (also preferable near 0.5), are particularly preferred.

It is also preferred, in general, that the particulate the density of alluviation filter aid materials useful in the present invention should be about less than 1.25 and can be less than 1 (as in the case of high density polyethylene at 0.99-0.98, or even lower although not desirably as low as for example polypropylene which is about 0.85—because the difference in density between the particulates and the liquid becomes too great and the tendency for the particles to float is expected to make filtration too difficult. With regard to preferred practice and the density of the particulate material, a density that is in practice not substantially different from the density of the liquid to be filtered (e.g. in the case of water or beer both having a nominal density of about 1) is generally preferred. However, oils or other lower density liquids could be matched to lower density particulate materials.

Other factors that have been found to be relevant to the performance of synthetic alluviation filter aids include characteristics such as particle sizes, degree of uniformity, specific surface and the chemical nature of the polymer. In connection with the latter, polyamides have many advantages and are preferred in practice.

Examples of particles sizes include those recited in European patent application EP-A-0,483,099 describes a filter aid intended to be used more particularly in the technique of alluviation in the field of brewing. This aid consists of spherical beads of particle size between 5 µm and 50 µm with an average diameter close to 20 µm. These aids are preferably used in the form of cakes whose porosity is between 0.3 and 0.5.

Preferred filter aids can comprise a population of individual angular particles. The angular shape of the particle is defined by a shape factor, while the population of the individual particles is defined by a uniformity coefficient.

The shape factor is the ratio between the smallest diameter $D_{min}$ and the largest diameter $D_{max}$ of the particles, said shape factor being comprised between 0.6 and 0.85.

The uniformity coefficient is the ratio between the diameter of 80% of the particles, and the diameter of 10% of the particles, said uniformity coefficient being comprised between 1.8 and 5.

Preferably, the specific surface of the particles constituting the aid measured according to the BET method, corrected by the value of the specific mass of the filter aid is preferably less than $10^6$ m$^2$/m$^3$.

The specific mass of the individual angular particles of said aid, is preferably not more than 25% greater than the specific mass of the suspension to be filtered, so that to avoid any phenomenon of settling out and segregation.

The angular particles are preferably formed from a polymer, such as synthetic polyamide.

According to a particularly preferred embodiment, the population of the individual angular particles is defined by a particle size distribution calculated from the volume of particles, having an average diameter from about 30 to about 40 µm, measured according to Malvern measurement method, by the fact that 70% and preferably 90% of the particles have a diameter between 15 and 50 µm.

The characterization of individual particles can be variously defined by:
 a shape factor ($\phi$) which is the ratio of the smallest Feret diameter ($D_{min}$) to the largest Feret diameter ($D_{max}$) of a particle (see also Particle Size Measurement—4$^{th}$ Edition, Terence Allen, edited by Chapman & Hall, Ltd., 1990). The shape factor is measured with an optical microscope such as described in Advanced in solid liquid separation, edited by Muralidhara (1986, Batelle Institute) or measured with an electronic microscope such as the apparatus Gemini, commercialized by the company LEO and using an analyser of image based on a software SCION. The Feret diameter is defined as the average value of diameters, measured between two parallel tangents of the projected outline of a particle (see also Transferts et Phases Dispersées of L. Evrard & M. Giot, edited by UCL).
 its specific surface ($S_0$) measured according to the Brunauer, Emmet and Teller (BET) measurement method defined in document "Powder surface area and porosity" of S. Lowell and J. Shields (edited by Chapman & Hall Ldt, 1991), and corrected by the specific mass of the filter aid (see also "Filtration Equipment Selection Modeling and Process Simulation of R. J. Wakeman and E. S. Tarleton (edited by Elsevier Advanced Technology, 1$^{st}$ edition)),
 its specific mass of the particles (Ma),
 its chemical composition,
 its physical nature.

The population of individual particles can be defined in part using a uniformity coefficient which is the ratio of D80 to D10 wherein D80 is 80% pass diameter of the particles, and D10 is 10% pass diameter of the particles, both being determined by the Malvern particle size analyse (with a laser beam, as defined in Transferts et Phases Dispersées of L. Evrard & M. Giot, edited by UCL); the pass diameter of a particle being the diameter that the specified percentage of the total sample of particles is less than or equal to, the average diameter of the particles ($D_{ave}$) calculated from the volume of the particles, measured according to the Malvern measurement method which defines an equivalent diameter.

The cake (the granular medium being obtained after filtration on a filter of the suspension (unfiltered liquid+filter aid)) is defined by:
 the specific resistance Rs, which is the resistance to the passage of the liquid through a cake of 1 kg of dry solid material deposed on 1 m$^2$ (Rs measured in m/kg),
 the apparent specific mass Mgs (in kg/m$^3$).
These measurements will determine:
 the porosity $\epsilon_0$ calculated from the apparent specific mass (see also the definition given by Filtration Dictionary, published by Filtration Society, 1975),
 the permeability $\beta_0$ (in Darcy), determined by measuring the specific resistance, and the actual specific mass $M_a$, determined by pycnometry (see also Filtration Equipment Selection Modeling and Process Simulation of R. J. Wakeman and E. S. Tarleton (Elsevier Advanced Technology, 1s$^t$ edition)).

Protein-Complexing Agents

Prior to the final filtration step, which is handled by using synthetic polymers, a specific protein treatment increases drastically the filtration performances of such filter cake, resulting in a significant decrease of the residual haze in the filtered liquid. Different protein-complexing agents are applicable i.e. gallotannins, carrageenan, isinglass, pectine, xanthan gum, silica gel, Na-silicate, colloidal silica, chitosan, alginate, zeolite, cationic starch and all possible combinations of these protein-complexing agents. The reaction time between the specific proteins and the complexing agent is relatively short, in the range of a few minutes of contact time, and the product could therefore be injected in-line just prior to the filtration step, or off-line by treating a batch of unfiltered liquid, and/or in an earlier process step, in-line or off-line. The protein-complexing agents play an active role in helping the formation of a complex and/or the precipitation with some specific proteins. A further advantage is the improvement of the future colloidal stability of the treated liquid, as a function of the nature and the quantity of the protein-complexing agent. As it is described in the background of the invention, the increase of the colloidal stability can be obtained by removing sensitive proteins and/or by eliminating some polyphenols, which are particularly reactive with some proteins to develop a colloidal instability. PVPP is very reactive and specifically with polyphenols, it is therefore recommended to reduce the required quantity of PVPP, to maintain the same effect on the colloidal stability, in order to get the same shelf-life of the finished product. The reduction of PVPP dosage is significant and is a function of the nature and the quantity of the protein-complexing agent. PVPP is normally dosed in filter aid applications in an empirically determined proportion, established by adjusting the addition of PVPP until a particular product's brewery quality specification is met. In accordance, however, with this present invention, the proportion of PVPP in the mixed filter aid is 10 to 40% less than its typical of the otherwise empirically predetermined proportion.

Mechanism of the Reaction

Without wishing to be bound by any theory or hypothesis, it is believed that the reduced final haze of the filtered liquid is due to the formation and the retention of a colloidal complex, between proteins, which are present in the unfiltered liquid and the complexing agent, which is added in a previous step of the filtration.

First of all, the complex is created in a short time in the liquid, and is mixed with the filter aid during the entire filtration step where both particles are retained on the filter, by means of the filter aid. The filter aid is composed of synthetic polymer, which offers very good mechanical properties; moreover it is an uncompressible or only slightly compressible material. On the other hand, the colloidal complex has very limited mechanical integrity and is highly compressible. Due to the compressibility of the colloidal complex, the porosity and/or the permeability of the deposited filter cake will decrease, resulting in an exacerbated increase of the differential pressure, which is measured between the inlet and the outlet of the filter. The dosage of the protein-complexing agent is preferably selected to avoid an excessive rate of pressure increase, which affects the filtration performance and which significantly decreases the volume of filtered liquid during the same production run, before reaching the maximum filtration operating pressure, specified by the filter supplier. The preferred quantity of complexing agent is less than what is necessary to achieve colloidal stability, related to prior art applications of such complexing agents. It is useful to understand that the mechanism of the reaction plays a direct and positive role on the final turbidity of the filtered liquid. The mechanism involved in this separation step can be mainly explained by the principle of flocculation, which includes the complexing agent having a long-chain polymeric molecule. The overall flocculation mechanism involves a molecular bridge or series of bridges between particles, and is considered as a sequence of reaction steps. Firstly the protein-complexing agent is dispersed in the liquid phase, secondly the protein-complexing agent diffuses to the solid-liquid interface, the complexing agent becomes adsorbed onto the solid surface, and the free polymer chain becomes adsorbed onto a second particle by forming bridges. This elementary floc grows by bridging with other particles. Practically, the optimum dosage rate of protein-complexing agent is a matter of experience, and an overdosing leads to create a well-stabilized liquid that is extremely difficult to separate. This flocculation process is considered as irreversible, but special care should be taken, in order to avoid excessive agitation, which tends to rupture flocs and therefore to create haziness in the suspension, due to the presence of colloidal material.

Two possible alternatives or a combination of both capture mechanisms could explain this phenomenon.

1. The first mechanism of capture is based on the physical properties of the cake and generally speaking is linked to the porosity of the cake, in such a way that:
    a. Particles of haze are captured in the formed complex, by physio-chemical reactions, and are retained within the filter cake, with no possibility of passing through the filter, resulting in a significant decrease of the residual haze of the filtered liquid. This process refers to a "depth" filtration.
    b. The formed complex, when it arrives in contact with the filter cake, fills partially the void volume of the filter cake, resulting in a slight increase of the pressure. The created effect is comparable to a mechanical barrier to the haze particles, which are captured by the resulting occlusion of filter cake, impacting on a significant decrease of the residual haze of the filtered liquid. This process refers to a "surface" filtration.
2. The second mechanism is based on the composition of the cake, and is linked to the presence of at least one polymer, which presents some electrostatic property. There is an electrostatic interaction between such polymers and the flocs, which are formed previously, during the flocculation between complexing agents and haze sensitive proteins. The residual electrostatic charges of the flocs are probably negative, attributed to the negative charges of the polyphenols. Considering this hypothesis, the preferred electrostatic charge of the polymer is positive, which explains the electrostatic interaction between the flocs and the polymer. Different polymers can be used, such as PVPP, and other polymers used in the technology of anionic resins (exchange of anions).
3. It is likelihood that the capture mechanism of haze is not incriminated to one or the other mechanisms, but results in a synergy of both mechanisms. Therefore, the reduction of the residual haze of the fresh filtered liquid results in a combination of physio-chemical bonds and mechanical retention.

Figure 2:
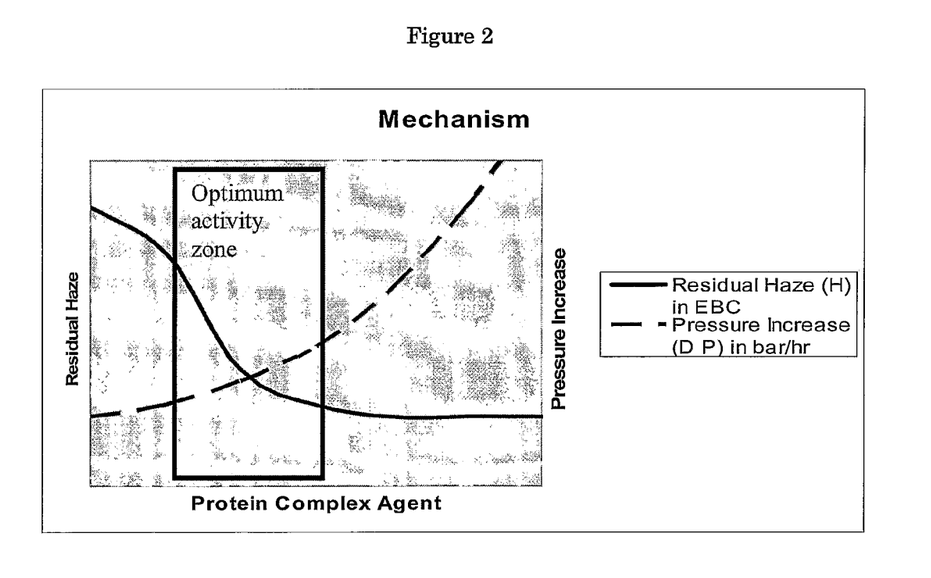
FIG. 2 is a quantitative graphical representation of a generalized relationship between residual haze and cross filter differential pressure in function of the quantity of protein complex agent.

The effect is illustrated in FIG. 2.

EXAMPLES

Some pilot trials were carried out in a pilot facility, where centrifuged industrial beer was filtered.

A filtration run of 20 hi was carried out, the type and the size of the filter is a candle filter of 0.54 m2 and the rate of the filtration is around 11 hl/hr.m2.

Prior to the filtration step the industrial centrifuged beer was treated with different dosage of gallotannins (Brewtan® from Omnichem): quantity comprising between 0.5 and 2.0 g/hl. The injection of the gallotannins was done in-line continuously, directly before the filtration of the beer, by using an appropriate dosing pump. It is also possible to dose the complexing agent by treating the batch of beer: i.e. into the tank of unfiltered beer.

In another experiment, the beer was treated prior to the filtration with a solution of colloidal silica instead of gallotannins. The tested silica sol (Stabisol 3000 from Stabifix or LUDOX® from GRACE Davison) had a concentration of about 30-31%, a density at 20° C. between 1.205 to 1.213 g/ml and a specific surface area of approximately 300 $m^2$/g, due to the average particle size of about 8 nm.

The filter aid was a mix of polyamide 11 and PVPP in the proportions of 50/50. The "best mode" characteristics of polyamide 11, which was used, were specified as follows:

average diameter around 33 g/m, measured according to Malvern method shape factor around 0.7, which is the ratio between the smallest diameter and the largest diameter of the particles, uniformity coefficient around 2.8, which is the ratio between the diameter of 80% of the particles, and the diameter of 10% of the particles, specific surface around $0.8 \times 10^6$ m$^2$/m$^3$, according to the BET method, specific mass about 1040 kg/m$^3$.

The PVPP (from BASF Company) was a mix of single use and reusable one, in the proportion of ½. The filter aid was dosed continuously during the filtration process at a dosage comprising between 50 and 130 g/hl. The dosage of filter aid was adapted as a function of the quantity of gallotannins, in order to avoid excessive pressure increases, as will now be readily apparent to persons skilled in the art, in light of the present disclosure.

Figure 3:
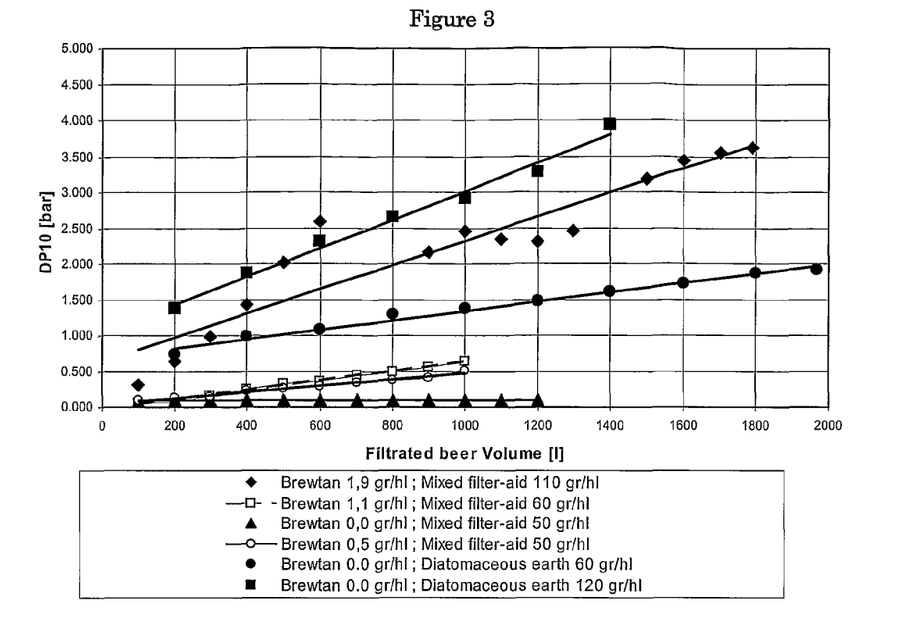
FIG. 3 is a graphical representation of the relationship between cross filter differential pressure and the filtered volume of beer during the same run with different quantities of protein complex agent (Brewtan®) of Omnichem. This figure also presents different quantities of mixed filter aid compared to the reference with Diatomaceous earth (DE).

FIG. 3 presents the increase of the pressure as a function of the filtered volume, at different dosages of gallotannins and filter aids. For all these dosages of gallotannins, the pressure increases are higher than what is obtained without addition of gallotannins. Moreover, the pressure increase is below the figure obtained with diatomaceous earth (DE) at a same filter aid dosage rate. It is also clear that the more added gallotannins, for a same filter aid dosage rate, the more impact on the pressure increase. At a dosage less than 2 g/hl, the increase of the differential pressure is still below the level obtained with DE excluding any dosage of gallotannins. We believe that the dosage rate of gallotannins should be less than 2 g/hl.

Figure 4:
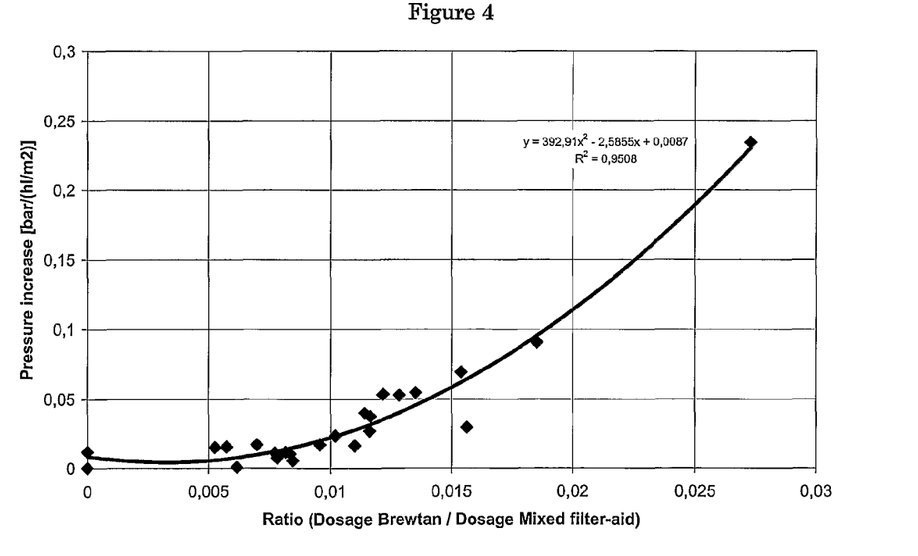
FIG. 4 is a graphical representation of the ratio between the Brewtan® quantity (g/hl) and the filter aid quantity (g/hl), in function of the differential pressure increase per $m^2$ of filtration area (bar/hl).

FIG. 4 represents the increase of the differential pressure at different ratio between the dosage rate of gallotannins (Brewtan®) and the dosage rate of filter aid. The differential pressure is expressed in bar/hl dived by the filter area in m$^2$, which allows comparisons between different filtration equipment. The exponential curve indicates that the obtained filter cake is slightly compressible, due to the presence of gallotannins, but also PVPP. By using the equation, it is clear that the brewer can calculate the ideal ratio (Brewtan®/filter aid), in order to avoid any excessive increase of the differential pressure. This ratio is specific for the filtration line (filter performances, presence and/or performances of the centrifuge, use of finings, etc.) and the quality of the unfiltered beer (quantity of yeast, haze, colloidal particles, temperature of the beer, etc.).

Figure 5:
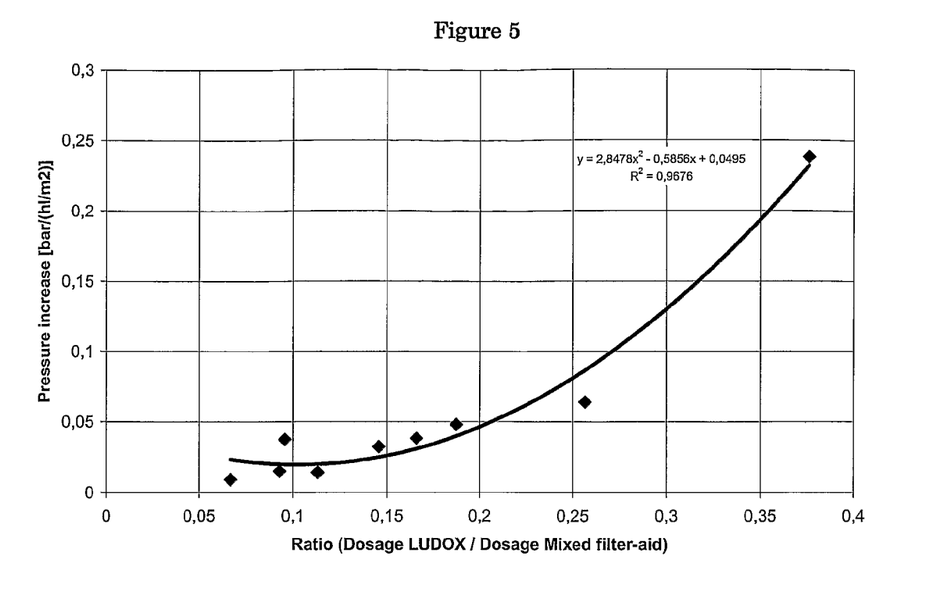
FIG. 5 is a graphical representation of the ratio between the LUDOX® quantity (g/hl) and the filter aid quantity (g/hl), in function of the differential pressure increase per $m^2$ of filtration area (bar/hl).

FIG. 5 represents the increase of the differential pressure at different ratio between the dosage rate of colloidal silica (LUDOX®) and the dosage rate of filter aid. The differential pressure is expressed in bar/hi dived by the filter area in m$^2$, which allows comparisons between different filtration equipment. The exponential curve indicates that the obtained filter cake is slightly compressible, due to the presence of gallotannins, but also PVPP. By using the equation, it is clear that the brewer can calculate the ideal ratio (LUDOX®/filter aid), in order to avoid any excessive increase of the differential pressure. This ratio is specific for the filtration line (filter performances, presence and/or performances of the centrifuge, use of finings, etc.) and the quality of the unfiltered beer (quantity of yeast, haze, colloidal particles, temperature of the beer, etc.).

Figure 6:
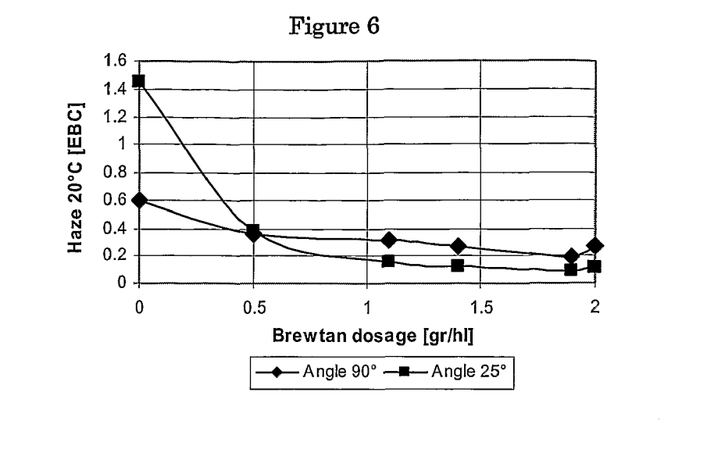
FIG. 6 is a graphical representation showing the decrease of the haze, measured at 90° and 25° of scattering angle at a temperature of 20° C., in function of the quantity of Brewtan® dosed prior to the filtration.
Figure 7:
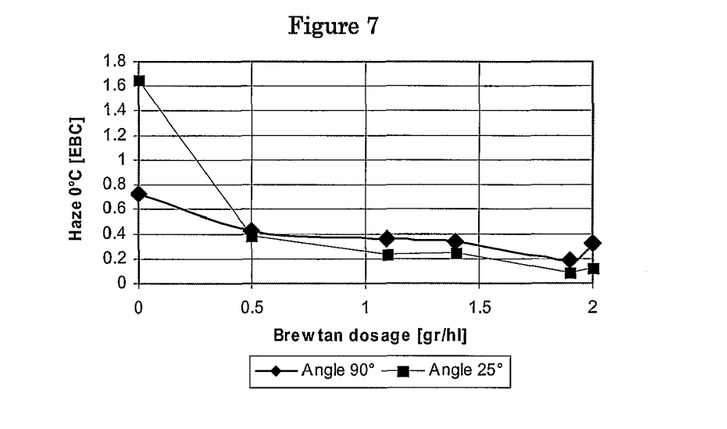
FIG. 7 is a graphical representation showing the decrease of the haze, measured at 90° and 25° of scattering angle at a temperature of 0° C., in function of the quantity of Brewtan® dosed prior to the filtration.

FIGS. 6 and 7 present the results of the residual haze in the filtered beer, obtained with different gallotannin dosages at two different temperatures. The presented results show a direct decrease of the residual haze of the beer, measured at two different scattering angles, as it is described in the background of the invention. The reduction is similar when it is measured at 20° C. and when it is measured at 0° C. Nevertheless the haze is slightly higher measured at 0° C. compared to the value measured at 20° C. A person skilled in the art will understand, in the light of the present disclosure, that at 0° C. the hydrogen bonds between polyphenols and proteins are significantly higher than it is at 20° C., this part of haze is also called reversible haze. A dosage between 0.5 and 1 g/hl of gallotannins is enough to reduce significantly the haze of the beer. The effect is more important on the haze measured at 25° scattering angle than it is at 900 scattering angle. It is also known that this dosage contributes to the overall colloidal stabilization, but it is not enough to provide the colloidal stability specifications required by the majority of the brewers.

Figure 8:
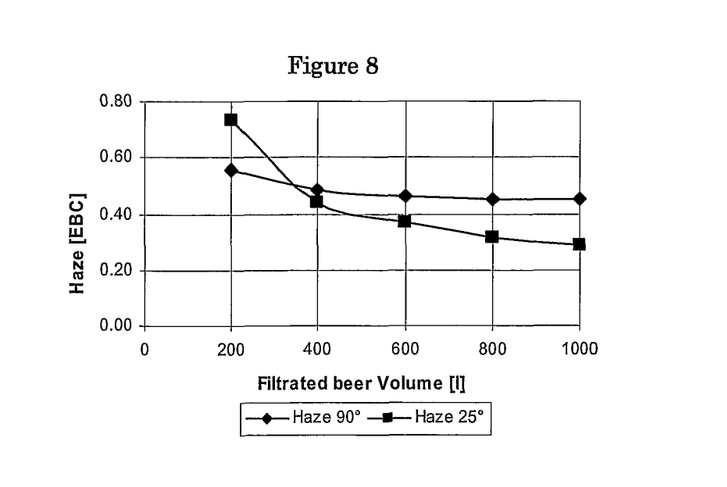
FIG. 8 is a graphical representation of the evolution of the haze obtained after filtration in function of the filtered volume at a dosage rate of around 1 g/hi of Brewtan®.

FIG. 8 shows the decrease of the haze during the filtration run, according to a treatment of 1 g/hl of gallotannins. At the beginning of the filtration, the haze decreases rapidly to become more stable.

Figure 9:
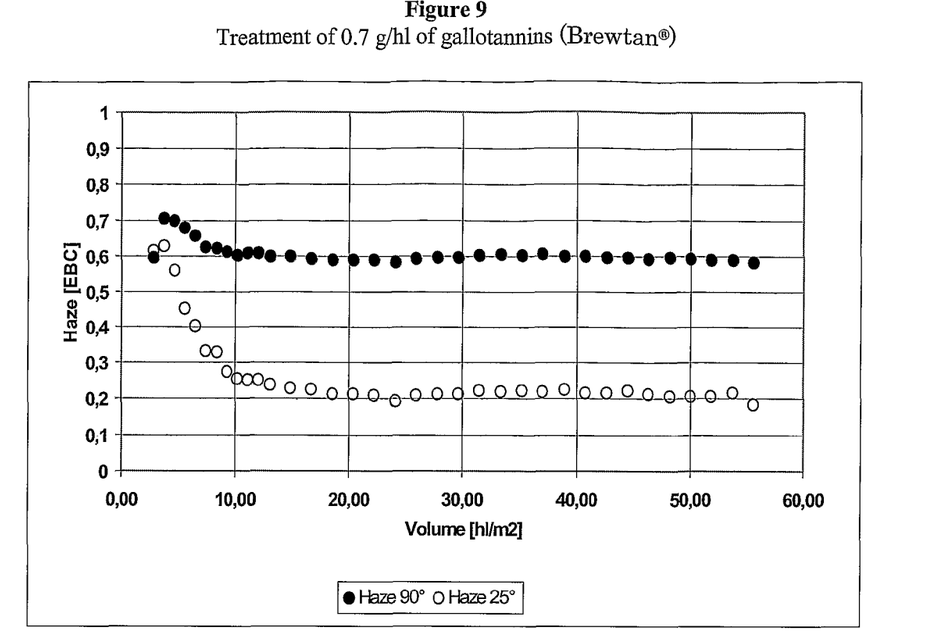
FIGS. 9 and 10 are graphical representations showing the decrease of the haze during the filtration run of a same batch of beer, according to respectively a treatment of 0.7 g/hl of Brewtan® (FIG. 12) and 9.3 g/hl of LUDOX® (FIG. 13).
Figure 10:
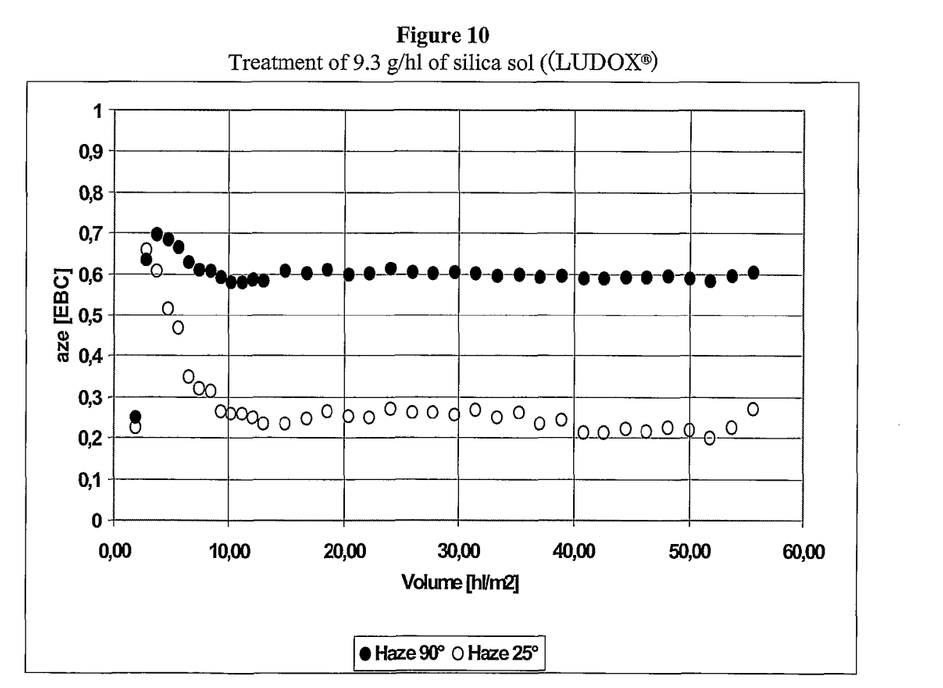

FIGS. 9 and 10 show the decrease of the haze during the filtration run, according to respectively a treatment of 0.7 g/hl of gallotannins (FIG. 9) and 9.3 g/hl of silica sol. (FIG. 10). During this experiment the same batch of beer was used for both treatment. The residual values of haze at 25° and 90°, obtained after respective filtration run, are very similar. This experiment proves that similar haze can be obtained after filtration by using gallotannins or colloidal silica, at the appropriated dosage rate.

Figure 11:
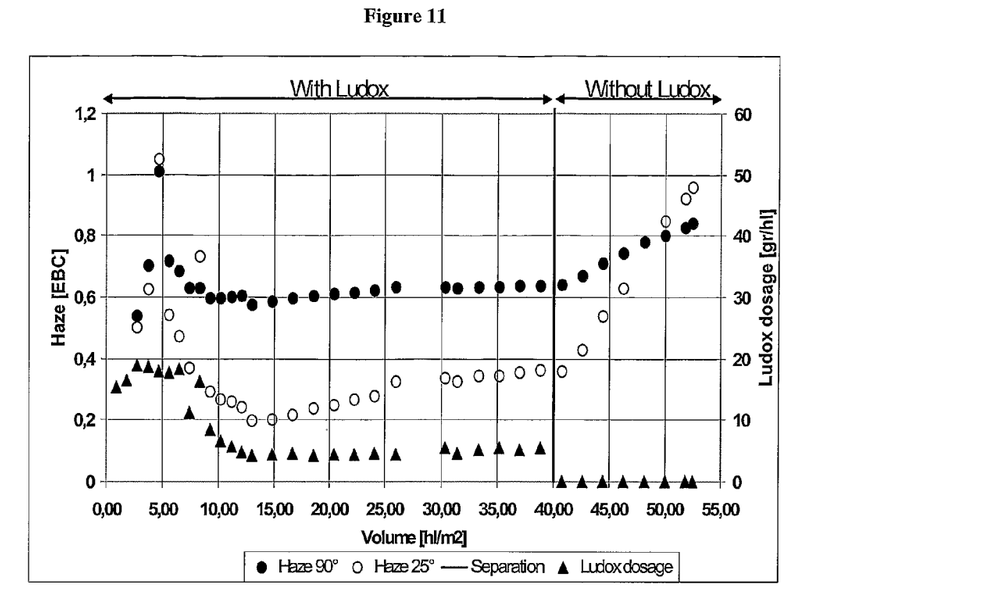
FIG. 11 is a graphical representation showing the haze results during the filtration run, with and without a treatment of silica sol (LUDOX®). The haze measured at 90° and 25° increase significantly when the treatment is stopped.

FIG. 11 shows the haze results during the filtration run, with and without a treatment of silica sol (LUDOX®). The haze results measured at 90° and at 25° of scattering angle are relatively constant and below the upper limit (0.7 EBC) during the filtration phase with Silica sol. As soon as the treatment is stopped, both hazes measured at 90° and 25° increase significantly at values above the upper limit of 0.7 EBC. This experiment proves that the treatment by complexing agent should be maintained during the entire filtration run or that it couldn't be interrupted without any risk on haze results.

An industrial trial was carried out in order to scale-up pilot results. The first test was done under the following conditions:

The beer was centrifuged before filtration, and the centrifuged beer contained between 200.000 and 500.000 cells/ml.

The temperature of the filtered beer was between −1° C. and 1.0° C.

The gravity of the filtered beer was 12.4° P.

The filter line had a capacity between 500 and 550 hi/hr.

The filter was a candle filter of 80 m$^2$ (metallic surface).

The filter aid was a mix of polyamide 11 and PVPP in the proportion of 50/50, as it was specify in the section "pilot trials".

The dosage rate of filter aid was between 60 and 70 g/hl.

Figure 12:
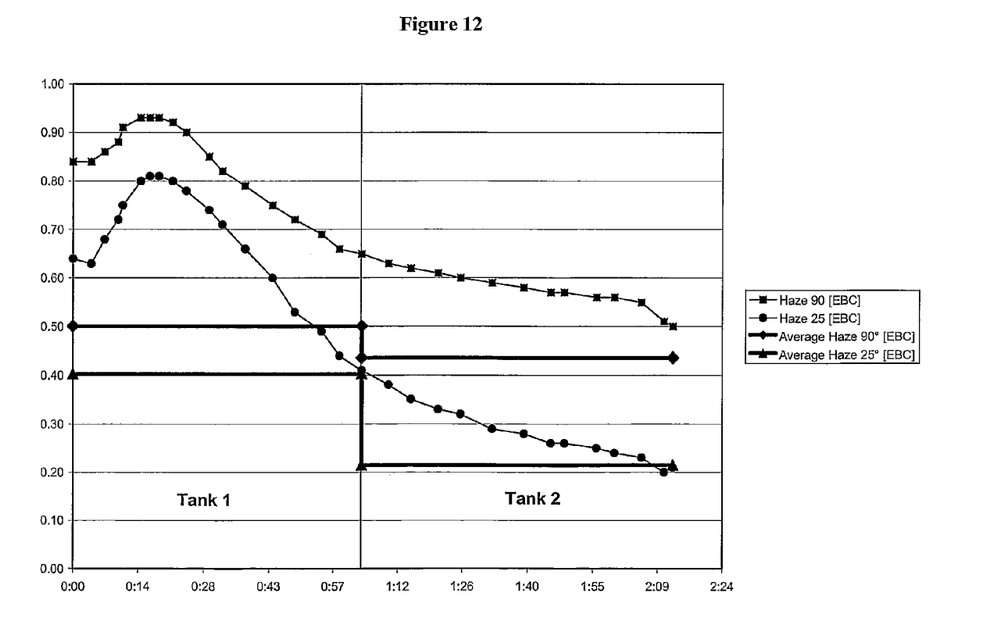
FIG. 12 is a graphical representation of the evolution of the haze measured at 90° and 25° scattering angle, during an industrial test of 1200 his (hector liters). The measured values of both hazes for each tank of filtered beer is also indicated.

The results of a first trial are represented in FIG. 12, where the reduction of hazes measured at 90° and 25° scattering angle are illustrated. During this trial of about 1.200 hl, which were collected in two bright beer tanks (BBT), each of 600 hl, the average dosage rate of protein complexing agent was about 0.45 g/hl of gallotannins (Brewtan®) The reduction of the haze is more significant at 25° than at 90° angle. The haze reduction decreases progressively during the filtration run and the average value of haze was measured in each BBT. The haze measured at 25° scattering angle had an average value of 0.4 EBC for the first BBT and around 0.2 EBC for the second BBT. The haze measured at 90° scattering angle had an average value of 0.5 EBC for the first BBT and around 0.45 EBC for the second BBT.

Figure 13:
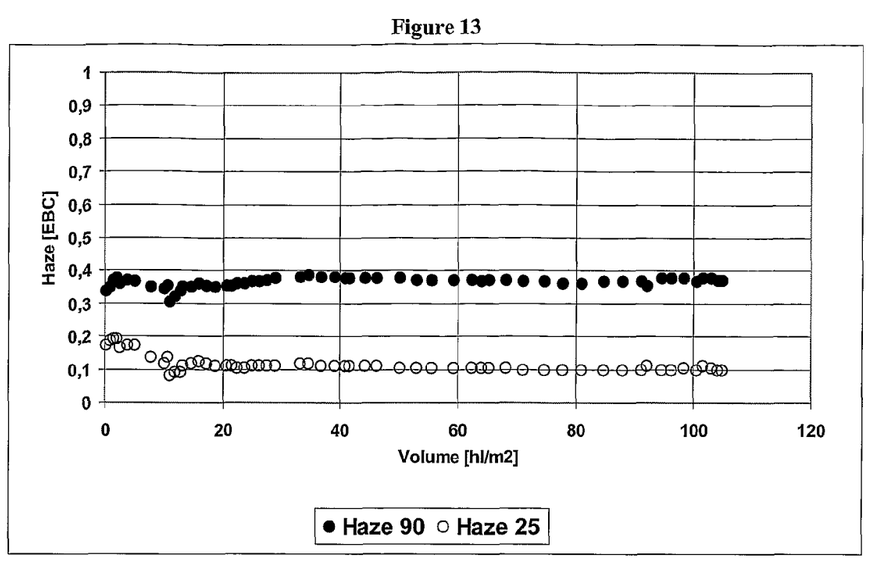
FIG. 13 is a graphical representation of the evolution of the haze measured at 90° and 25° scattering angle, during an industrial test of more than 8.000 his.

In a second long filtration run, of more than 8.000 hi, the average dosage rate of protein complexing agent was about 0.45 g/hl of gallotannins (Brewtan®). This experiment proves that during the entire filtration run, both haze at 90° and 25° are quite stable and below the upper limit of 0.7 EBC. The haze measured at a scattering angle of 90° was stabilized around 0.4 EBC and was higher than the haze measured at a scattering angle og 25°, which was stabilized below 0.1 EBC.

In general therefore, a preferred average treatment of about 0.5 g/hl of gallotannins is enough to reach less than 0.5 EBC (measured at 90° and 25° scattering angle at a temperature of 0° C.) as residual haze of the beer after filtration, and the maximum effect is obtained with a dosage of 1 g/hl, with no complementary effect above this dosage. On the contrary, higher dosages will generate excessive pressure increases, which will affect the quantity of filtered beer during the same filtration run.

Similarly, in preferred practices where colloidal silica is used as complexing agent at a preferred average dosage rate around 10 g/hl with a maximum average quantity around 25 g/hl. Above this dosage, the pressure increase becomes excessive, and affects negatively the quantity of filtered beer during the same filtration run.

The invention claimed is:

1. A method of filtering a liquid comprising haze-sensitive proteins, the method comprising:
    (a) providing a synthetic filter aid on a filter support;
    (b) providing a liquid to be filtered, the liquid comprising haze sensitive proteins;
    (c) adding protein-complexing agents to said liquid to be filtered;
    (d) allowing the protein-complexing agents and the haze sensitive proteins to react so as to obtain a complex in said liquid; and
    (e) filtering said liquid comprising said complex over the synthetic filter aid on said filter support so as to obtain a filtered liquid having a 25° haze less than 0.7 EBC.

2. The method according to claim 1, wherein the filtering step is a "surface" filtration process.

3. The method according to claim 1, wherein the synthetic filter aid comprises synthetic polymers selected from the group consisting of polyvinylpolypyrrolidone (PVPP), polyamide, polyvinylchloride, fluorinated products, polypropylene, polystyrene, polyethylene, polybutene, polymethylpentene, ethylene copolymers, binary copolymers and terpolymers with acrylics, olefinic thermoplastic elastomers and mixtures, polypolymers or co-extrusions thereof.

4. The method according to claim 3, wherein the mixture of synthetic polymers used as filter aid is reusable after regeneration.

5. The method according to claim 2, wherein the surface filtration process is an electrostatic attraction between the complex and at least one synthetic polymer of the filter aid.

6. The method according to claim 5, wherein the at least one synthetic polymer has a positive electrostatic charge.

7. The method according to claim 6, wherein the at least one synthetic polymer having a positive electrostatic charge is PVPP.

8. The method according to claim 7, wherein the PVPP is mixed with other polymers in a predetermined proportion, in function of the polyphenol content in the liquid, resulting in a mixed filter aid, in order to obtain colloidal stability of the filtered liquid.

9. The method according to claim 1, wherein the protein-complexing agent is selected from one or more members of the group consisting of: tannin, carrageenan, isinglass, pectine, xanthan gum, colloidal silica, chitosan, alginate, and cationic starch.

10. The method according to claim 9, wherein the tannin protein complexing agent is gallotannin.

11. The method according to claim 10, wherein gallotannin is added to the liquid to be filtered at a dosage rate between 0.1 g/hl and maximum 2 g/hl, as a function of the haze sensitive protein content of the liquid to be filtered.

12. The method according to claim 3, wherein colloidal silica is added to the liquid to be filtered at a dosage rate between 10 g/hl and maximum 25 g/hl, as a function of haze sensitive protein content in the liquid to be filtered.

13. The method according to claim 1, wherein the liquid to be filtered is a fruit or a cereal based beverage with a pH between 4 and 6.

14. The method according to claim 13, wherein the beverage is a malt based beverage.

15. The method according to claim 14, wherein the beverage is a fermented malt based beverage with a pH between 3 and 5.

16. The method according to claim 15, wherein the fermented malt based beverage is a beer.

* * * * *